(12) United States Patent
Condict et al.

(10) Patent No.: US 9,280,288 B2
(45) Date of Patent: *Mar. 8, 2016

(54) USING LOGICAL BLOCK ADDRESSES WITH GENERATION NUMBERS AS DATA FINGERPRINTS FOR NETWORK DEDUPLICATION

(71) Applicant: NetApp, Inc., Sunnyvale, CA (US)

(72) Inventors: Michael N. Condict, Lexington, MA (US); Steven R. Kleiman, Los Altos, CA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/699,813

(22) Filed: Apr. 29, 2015

(65) Prior Publication Data

US 2015/0248240 A1 Sep. 3, 2015

Related U.S. Application Data

(63) Continuation of application No. 13/965,012, filed on Aug. 12, 2013, now Pat. No. 9,043,430, which is a continuation of application No. 12/610,231, filed on Oct. 30, 2009, now Pat. No. 8,799,367.

(51) Int. Cl.
| | |
|---|---|
| *G06F 15/167* | (2006.01) |
| *G06F 3/06* | (2006.01) |
| *H04L 29/08* | (2006.01) |
| *H04L 29/06* | (2006.01) |
| *G06F 12/08* | (2006.01) |
| *H04L 12/861* | (2013.01) |

(52) U.S. Cl.
CPC .............. *G06F 3/0608* (2013.01); *G06F 3/065* (2013.01); *G06F 3/067* (2013.01); *G06F 3/0619* (2013.01); *G06F 3/0641* (2013.01); *G06F 3/0679* (2013.01); *G06F 12/0813* (2013.01); *G06F 12/0815* (2013.01); *H04L 29/08549* (2013.01); *H04L 49/9063* (2013.01); *H04L 67/2842* (2013.01); *H04L 69/04* (2013.01); *G06F 2206/1014* (2013.01)

(58) Field of Classification Search
CPC ..... G06F 3/0608; G06F 3/064; G06F 3/0641; G06F 3/0647
USPC .................................................. 709/214, 248
See application file for complete search history.

(56) References Cited

U.S. PATENT DOCUMENTS

| | | | |
|---|---|---|---|
| 8,799,367 B1 * | 8/2014 | Condict et al. ................ | 709/205 |
| 9,043,430 B2 * | 5/2015 | Condict et al. ................ | 709/214 |
| 2007/0174567 A1 * | 7/2007 | Deguchi et al. ................ | 711/162 |
| 2011/0040728 A1 * | 2/2011 | Akirav et al. .................. | 707/634 |
| 2011/0099342 A1 * | 4/2011 | Ozdemir ........................ | 711/162 |

\* cited by examiner

*Primary Examiner* — Duyen Doan
(74) *Attorney, Agent, or Firm* — Gilliam IP PLLC

(57) ABSTRACT

The technique introduced here involves using a block address and a corresponding generation number as a "fingerprint" to uniquely identify a sequence of data within a given storage domain. Each block address has an associated generation number which indicates the number of times that data at that block address has been modified. This technique can be employed, for example, to determine whether a given storage server already has the data, and to avoid sending the data to that storage server over a network if it already has the data. It can also be employed to maintain cache coherency among multiple storage nodes.

8 Claims, 11 Drawing Sheets

USING LOGICAL BLOCK ADDRESSES WITH GENERATION NUMBERS AS DATA FINGERPRINTS FOR NETWORK DEDUPLICATION

CROSS-REFERENCE TO RELATED APPLICATION

This application is a continuation of U.S. patent application Ser. No. 13/965,012, entitled "USING LOGICAL BLOCK ADDRESSES WITH GENERATION NUMBERS AS DATA FINGERPRINTS FOR NETWORK DEDUPLICATION", which was filed on Aug. 12, 2013, which is a continuation of U.S. patent application Ser. No. 12/610,231, entitled "USING LOGICAL BLOCK ADDRESSES WITH GENERATION NUMBERS AS DATA FINGERPRINTS FOR NETWORK DEDUPLICATION", which was filed on Oct. 30, 2009, now issued as U.S. Pat. No. 8,799,367 on Aug. 5, 2014, which is incorporated by reference herein in its entirety.

FIELD OF THE INVENTION

At least one embodiment of the present invention pertains to data storage systems, and more particularly, to a technique for using a logical block address and an associated generation number as a data fingerprint for network deduplication.

BACKGROUND

Network storage is a common approach for making large amounts of data accessible to many users and/or for backing up data. In a network storage environment, a storage server makes data available to client systems by presenting or exporting to the clients one or more logical containers of data. There are various forms of network storage, including network attached storage (NAS) and storage area networks (SANs). In a NAS context, a storage server services file-level requests from clients, whereas in a SAN context a storage server services block-level requests. Some storage servers are capable of servicing both file-level requests and block-level requests.

One common application of network storage is data mirroring. Mirroring is a technique for backing up data, where a given data set at a source is replicated exactly at a destination, which is often geographically remote from the source. The replica data set created at the destination is called a "mirror" of the original data set. Typically mirroring involves the use of at least two storage servers, e.g., one at the source and another at the destination, which communicate with each other through a computer network or other type of data interconnect to create the mirror.

In a large-scale storage system, such as an enterprise storage network, it is common for some data to be duplicated and stored in multiple places in the storage system. Sometimes data duplication is intentional and desired, as in mirroring, but often it is an incidental byproduct of normal operation of a storage system. For example, a given sequence of data may be part of two or more different files, LUNS, etc. Consequently, it is frequently the case that two or more blocks of data stored at different block addresses in a storage server are actually identical. Data duplication generally is not desirable, since storage of the same data in multiple places consumes extra storage space, which is a limited resource. Consequently, in many large-scale storage systems, storage servers have the ability to "deduplicate" data.

Deduplication is a well-known method for increasing the capacity of a storage device or system by replacing multiple copies of identical sequences of data with a single copy, together with a much smaller amount of metadata that allows the reconstruction on demand of the original duplicate data. Techniques for deduplicating within a single storage server (or a single node in a storage cluster) are in wide-spread commercial use.

A related use of deduplication is to reduce the amount of data sent over a network, such as in a data mirroring system. If the recipient of transmitted data stored a set of data segments, and another node of the network wants to send it another data segment, deduplication techniques can be used to avoid sending the data segment if the recipient already has an exact copy of it. This is called network deduplication, or network acceleration, because it increases the effective bandwidth of the network.

The conventional method for identifying duplicate data segments involves using a hash function, such as SHA-1, to compute an integer, called a "fingerprint", from each data segment, where different data is extremely unlikely to produce the same fingerprint. When one node of a network wishes to send a data segment to another node, but only if the data segment is not already present on the other node, the sending node can first send the fingerprint, and the receiving node can inform the sending node whether or not it already has a data segment with that fingerprint. Only if the fingerprint is not found on the receiving node is the data segment sent.

There are two problems with the use of a hash value as a data fingerprint. Firstly, while it is very unlikely, it is possible that two different data segments can produce the same hash value. If that occurs, data corruption can result. Further, the larger the amount of data managed by a given system in a given period of time, the greater is the likelihood that two different data segments actually will produce the same hash value. In a very large-scale storage system, therefore, this very small likelihood can increase to an unacceptably high value.

Additionally, hash values generated by conventional hash algorithms can be quite lengthy, e.g., at least 160 bits (as with SHA-1). Consequently, computing and comparing hash values can be computationally intensive, consuming a significant amount of processor resources. Likewise, a significant amount of storage space can be required to store the hash values in a given storage server or node.

SUMMARY

The technique introduced here involves using a block address and a corresponding generation number to uniquely identify a sequence of data (i.e., as a data "fingerprint") within a given storage domain, for example, in a given storage system. Each block address has an associated generation number which indicates the number of times that data at that block address has been modified.

The technique introduced here can be employed, for example, to improve network deduplication, such as to determine whether a given storage server already has the data, and to avoid sending the data to that storage server over a network if it already has the data, such as for deduplication purposes.

This technique can also be employed, for example, to maintain cache coherency in a variety of different applications. For example, it can be used where each of multiple network storage nodes caches portions of a shared, distributed set of data and has write privileges for the set of data. It can also be used to maintain cache coherency where readmodify-write operations are used by caching clients to perform partial-block writes. Further, the technique can be used to distinguish valid and invalid data when multiple versions of a given data block are stored in the same cache and/or when a caching device boots up after being offline.

Other aspects of the technique will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Figure 1A:
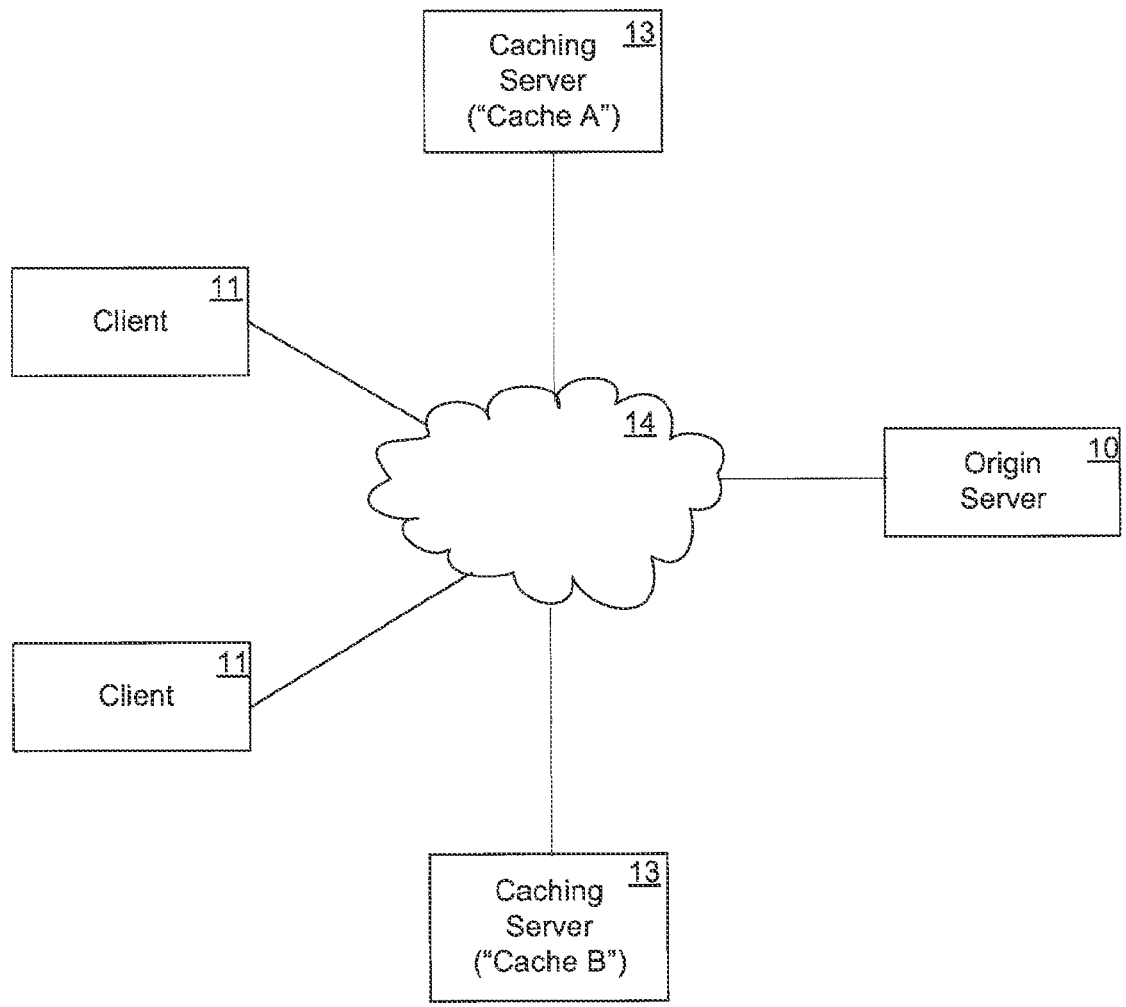
FIGS. 1A and 1B show examples of network storage environments in which the technique introduced here can be applied.

References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

The technique introduced here involves using a logical block address and a corresponding generation number together as a "fingerprint" for a sequence of data, to uniquely identify the sequence of data within a given storage domain (e.g., in a given storage system). Each logical block address has an associated generation number which indicates the number of times that data at that block address has been modified. The generation number of a block address is incremented each time the data at that block address is modified. This technique can be employed, for example, to maintain cache coherency in various different contexts (e.g., among multiple storage nodes on a network, where each of the nodes caches portions of a shared, distributed set of data and has write privileges for the set of data). It can also be employed in the context of deduplication over a network, e.g., to determine whether a given storage server already has the data, and to avoid sending the data to that storage server over a network if it already has the data, thereby reducing consumption of bandwidth between a source and destination and destination. In an extent based file system, a generation number can be assigned on a per-extent basis and used in a manner similar to that described here.

Identifying data by its location (e.g., block address) is more computationally efficient than computing a high-quality hash function on the data. It also has the advantage that different data never yields the same fingerprint: two different data segments always have different locations, so there is no chance of an error in data identification. However, using location as the identifier of the data is problematic if the data at that location changes at one device in a storage system but not in another device in that system. In that case, the location will identify different content on the two devices. Therefore, use of a location-based fingerprint requires solving the problem of how to determine whether both sides of the network have the same value stored at the specified location. This can be done by using a generation number, which is essentially a version identifier for an associated block address. The combination of a logical block address and its associated generation number uniquely identifies a sequence of data within a given storage domain. In one embodiment, the generation number is a binary integer of sufficient length to prevent the possibility of overflow in the lifetime of a given data volume (consider, for example, that a 48-bit number incremented 50,000 times per second will not overflow for 178 years). Note, however, that the term "number" in generation number is not meant to exclude the possibility of using non-numeric characters as generation numbers or as parts thereof.

The technique introduced here therefore includes creating a reference for each data block at the source storage system, where the reference is unique within the context of a given storage domain, such as a given storage system. The reference can be, for example, the combination of a logical block address and a generation number. In certain embodiments, the logical block address is a virtual volume block number (VVBN) of the data block, which is described further below. In another embodiment, the logical block address can be a data segment number, a file pathname or file handle combined with an offset, or other type of identifier.

Cache Coherency

Referring now to FIG. 1A, the technique introduced here can be used, for example, to maintain cache coherency among various caching nodes in a distributed system, relative to a distributed set of data for which each node has write privileges. Cache coherency refers to the consistency of data stored in one or more caches of multiple caches that share a data resource. In FIG. 1A, an origin server 10 on a network contains the master version of content that is accessible, at least indirectly, to various clients 11 on a network 14. Portions of that content are cached on each of multiple caching servers 13 (which can be part of or separate from the physical machines that implement the clients 11). Assume further that each client 11 has write privileges to all portions of the data cached on any of the caching servers 13, and each caching server 13 has write privileges to any of the data stored on the origin server. In one embodiment each caching server 13 is a conventional server computer configured to perform caching of network based content.

Each client 11 has write privileges to all portions of the data cached on any of the caching servers 13, and each caching server 13 has write privileges to any of the data stored on the origin server 10. Note that in another embodiment, the caching servers 13 are implemented in the same physical machines as the clients 11. This would be the case with, for example, Network File System (NFS), where client machines commonly cache the contents of NFS files. In yet another embodiment, one or more of the caching servers 13 are implemented in the same physical machine as the origin server 10; for example, a caching server 13 could be implemented as part of the N-module in a distributed server (described below), although this may not be as efficient as an embodiment in which they are implemented in client machines.

In accordance with the techniques introduced here, generation numbers can be associated with logical block addresses to ensure cache coherency when any of multiple caching clients (buffer caches) can modify partial blocks of storage. In particular, this approach can be applied to implement an optimistic concurrency technique when using a read-modify-write process to safely modify part of a data block. As noted above, to support modification of just part of a block that is not currently in the cache, a caching client device can use the read-modify-write technique. However, if two caching clients attempt to do this with the same block at the same time, a cache coherency error can result. The association of generation numbers with logical block addresses as described here can be used to solve this problem. The following is an example of how this can be done.

Suppose one of the caching servers 13 in FIG. 1A, "Cache A", is asked by a user process to write some data to the first three bytes of a given data block, block-10. Cache A does not currently have block-10 cached, so it fetches a copy of block-10 from the origin server. The origin server 10 sends a copy of block-10 to Cache A and informs Cache A that the transmitted copy is version 17 of the block. Cache A then modifies the first three bytes of the cached block, as specified by the user.

Suppose further that another one of the caching servers 13, "Cache B", does the same thing for the last five bytes of block-10. At this point block-10 has not yet been modified on the origin server. Cache A then sends back its modified copy of version 17 of block-10, and tells the origin server 10 that it is sending version 18 of the block. The origin server 10 verifies that it currently has version 17, so 18 is a valid version number for the next version. The origin server 10 stores the data and updates the version number for this block to 18.

Cache B then sends back its modified copy of version 17 of block-10, and tells the origin server 10 that it is sending version 18 of the block. The origin server 10 determines that it already has version 18, so it replies back to Cache B, informing it that its attempted write is invalid. As a result, Cache B has to perform another read-modify-write sequence. That is, it has to fetch version 18 of block-10 from the origin server 10, then modify its last five bytes of version 18 of block-10, and then send it as version 19 back to the origin server 10, which will accept it this time. Thus, in this example scenario, a valid write request for a given data block is one in which the generation number in the write request corresponds to a later generation than the latest generation number of that data block stored on the origin server.

Figure 5:
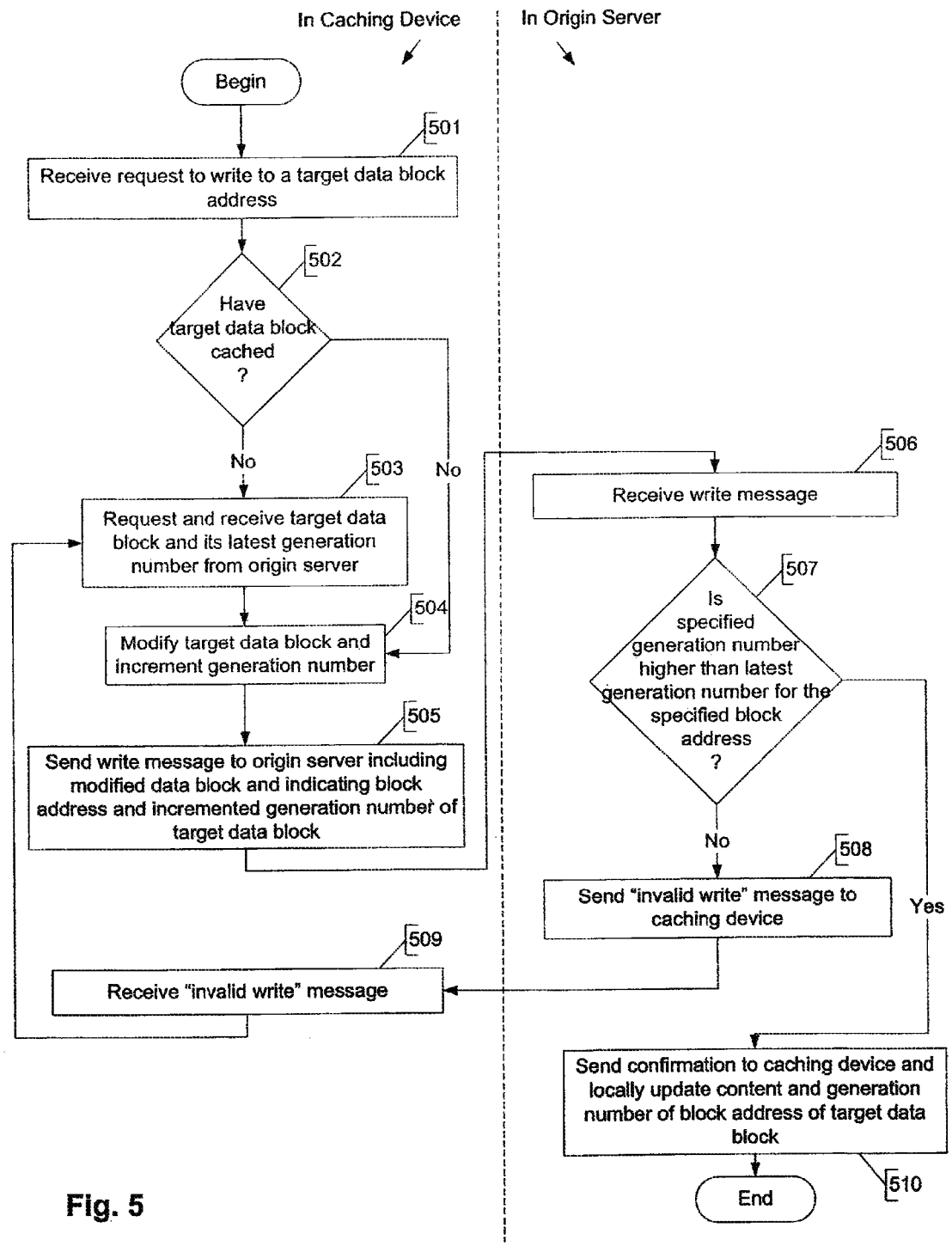
FIG. 5 is a flow diagram of a process for using a logical block address and generation number to maintain cache coherency, according to a first embodiment.

This technique is illustrated in FIG. 5. Note that in FIG. 5 and in other drawings in this document, certain operations which are not germane to the technique being introduced may be omitted, in order to simplify description. At 501 a caching device (e.g., a caching server 13 in FIG. 1A) receives a request to modify a portion of a data block (the "target data block"). Next, at 502 the caching device determines whether it has the target data block cached. If it does not have the target data block cached, then at 503 the caching device requests and receives the target data block in its latest generation number from the origin server (e.g., origin server 10 in FIG. 1A), and then at 504 modifies the target data block according to the client request and increments the generation number of the corresponding block address. If the caching device does have the data block cached (502), then it proceeds directly from 502 to 504.

After modifying the target data block locally, the caching device sends a write message to the origin server at 505, including the modified data block and indicating the block address and the incremented generation number of the target data block. The origin server receives that write message at 506 and responds by determining at 507 whether the generation number specified in the message is higher than the latest generation number the origin server has stored for the specified block address. If so, the process proceeds to 510, where the origin server sends confirmation of the write to the caching device and locally updates the content and generation number of the block address of the target data block. If the specified generation number is not higher than the latest generation number the server has for that block address, then the process instead proceeds to 508, where the server sends an "invalid write" message to the caching device. In response to receiving the "invalid write" message at the caching device at 509, the process loops back to 503, as described above.

Another useful application of the techniques introduced here is to determine which cached blocks are still valid (i.e., in agreement with a master copy at the server) after rebooting a persistent cache. Where multiple different caching devices can modify the same primary storage, a cache invalidation technique is employed when a caching device modifies a block of storage, to let other caching devices know that their copies of that cached block are no longer the latest version. This is usually done as follows:

First, the caching device that is modifying a given block writes a new version of the data for that block to its cache, and also notifies the storage server that it has modified that block (the caching device may or may not send the new data immediately to the server, depending on whether it is a write-through cache or a write-back cache). In response, the storage server will then immediately notify all caching devices that have a copy of that block that their copy is now invalid. This method works correctly while all the caching devices are up and running. However, if the caching devices are implementing persistent caches, and any caching device that has that block cached is offline when the modification takes place (i.e., powered down, inactive, off the network, or otherwise out of communication with the server), then some other method is needed to ensure that when that caching device is rebooted, it will not treat its out-of-date copy of the block as valid data.

Association of generation numbers with logical block address is can be used to solve this problem as follows. Each caching device persistently stores metadata including a block address and generation number, for each cached data block. Upon reboot, each caching device reloads all of that metadata. However, each caching device will also mark all of its cached blocks as suspect, because any or all of them may be invalid, i.e., not the latest version, due to writes that happened when the client was down. Any known or convenient technique can be used to mark a block as suspect (e.g., a bit flag). Whenever a user tries to read one of the cached blocks marked as suspect from a caching device, that caching device sends the block address and generation number to the storage server and asks the storage server whether it is still the latest version of the cached data block. If the server replies that it is the latest version (based on the generation number being up to date), then the caching device marks the cached block as valid (no longer suspect), and the block will henceforth be treated as valid, until and unless the server invalidates it. Otherwise, the cached block is treated as invalid, and the client fetches a new copy of the data from the server in order to satisfy the read request.

Figure 6:
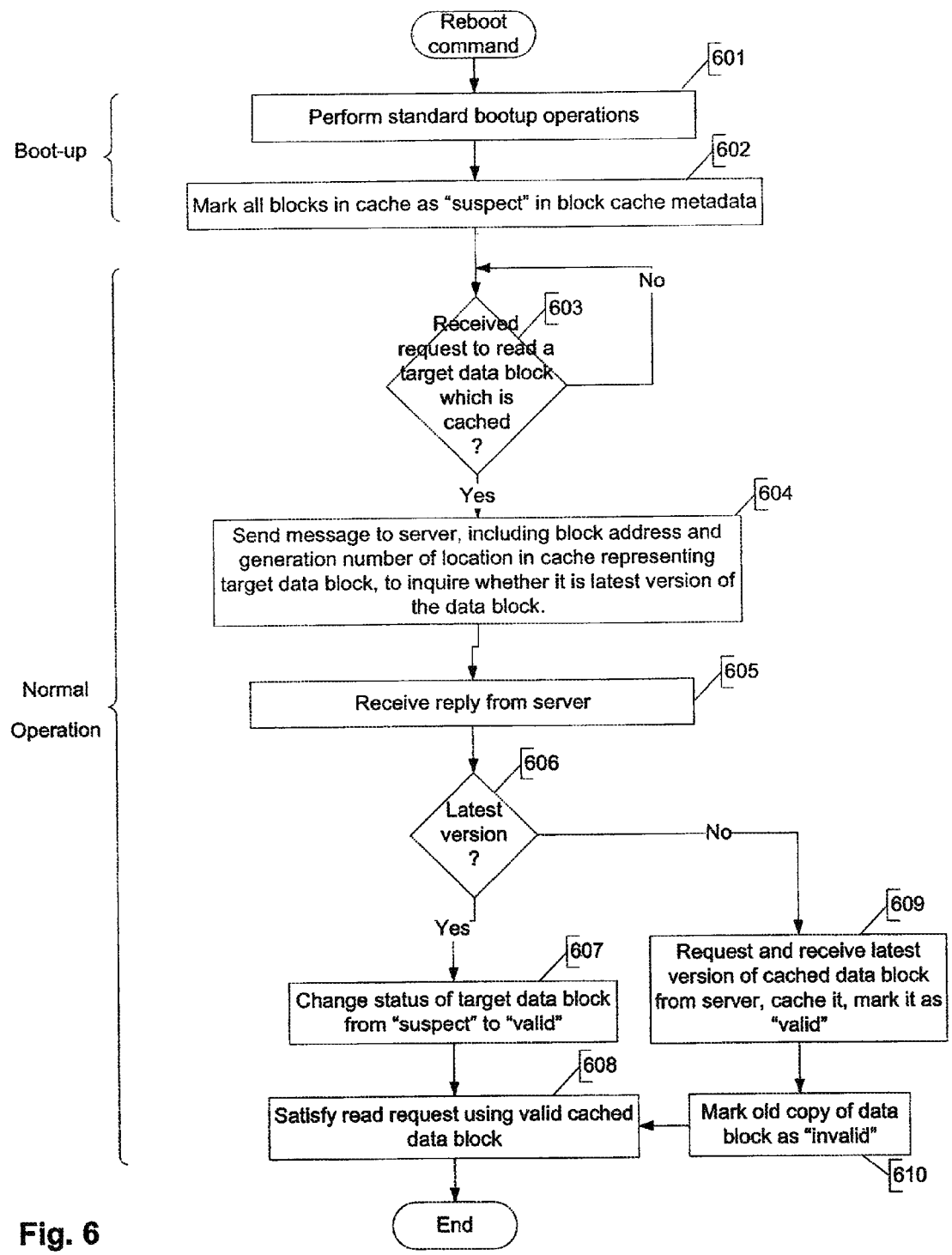
FIG. 6 is a flow diagram of a process for using a logical block address and generation number to maintain cache coherency, according to a second embodiment.

This technique is illustrated in FIG. 6. Initially, in response to a reboot command, a caching device (e.g., a caching server 13 or client 11) performs typical boot-up operations at 601. (Here the terms "boot", "boot-up", "reboot", etc. all are intended to mean any type of initialization or reinitialization process.) The specifics of these operations are not germane to the technique being introduced d here. Then at 602, the caching device marks all blocks in the cache as "suspect" in their block metadata; this can be considered part of the boot-up process. As noted above, this block metadata can be, but does not have to be, stored in the caching device itself.

During normal operation, when a request is received (603) by the caching device to read a target data block which is cached, the caching device sends a message to the server at 604, including the logical block address and generation number of a location in the cache representing the target data block, to inquire whether it is the latest version of the data block. At 604, the caching device receives a reply to the message from the server. If the reply indicates that it is the latest version (according to the server's records) (606), then at 607 the caching device changes the status of the location in the cache from "suspect" to "valid" in its cache metadata. The caching device than satisfies the read request using the valid cached data block at that location at 608. If, on the other hand, the reply from the server indicates the data block is not the latest version (606), then the process instead branches from 606 to 609, where the caching device requests and receives the latest version of the cached data block from the server, caches it, and marks it as "valid" in its block metadata. The caching device then marks the old cached copy of the block as "invalid" at 610, and then proceeds to 608 as described above.

Yet another useful application of generation numbers, relating to cache coherency, is to determine which copy of a cached data block is the most recent copy when rebooting a persistent cache, when multiple copies of the block have been stored at different locations in the same cache. For example, when using flash memory as a caching device, it improves performance significantly to do mostly sequential writes to the cache, because random writes to flash memory are much slower than sequential writes. The advantage of sequential writes is so large for some types of flash memory that it is sometimes preferable to write new data for a cached block to the next sequentially chosen position in the cache, rather than overwriting the older copy of the block (which would entail a non-sequential write). A disadvantage of doing that, however, is that the cache then contains two or more different versions of the data for that block. This situation reduces the amount of useful data the cache can hold.

It also introduces another problem if the cache is a persistent cache (i.e., if the data in the cache is to be preserved across reboots of the cache). While the cache is in operation, it can use metadata to keep track of which cache location has the latest version of each cached block of storage, ignoring the older versions. But when the persistent cache is rebooted, it needs some way to determine which of the multiple versions of a cached data block is the latest one.

By storing in the flash memory metadata including a generation number together with a block address for each cached block of data, the latest version of a block can be identified when the reboot process takes place. In one embodiment, therefore, upon reboot of the cache, all of that metadata is scanned, and only the latest version of each cached block, as determined by the highest generation number for that block, is treated as valid when the cache resumes operation. Note that in other embodiments, the metadata including generation numbers may be stored in a location other than in the caching device itself, assuming that the cache upon reboot "knows" where to look for the metadata.

Figure 7:
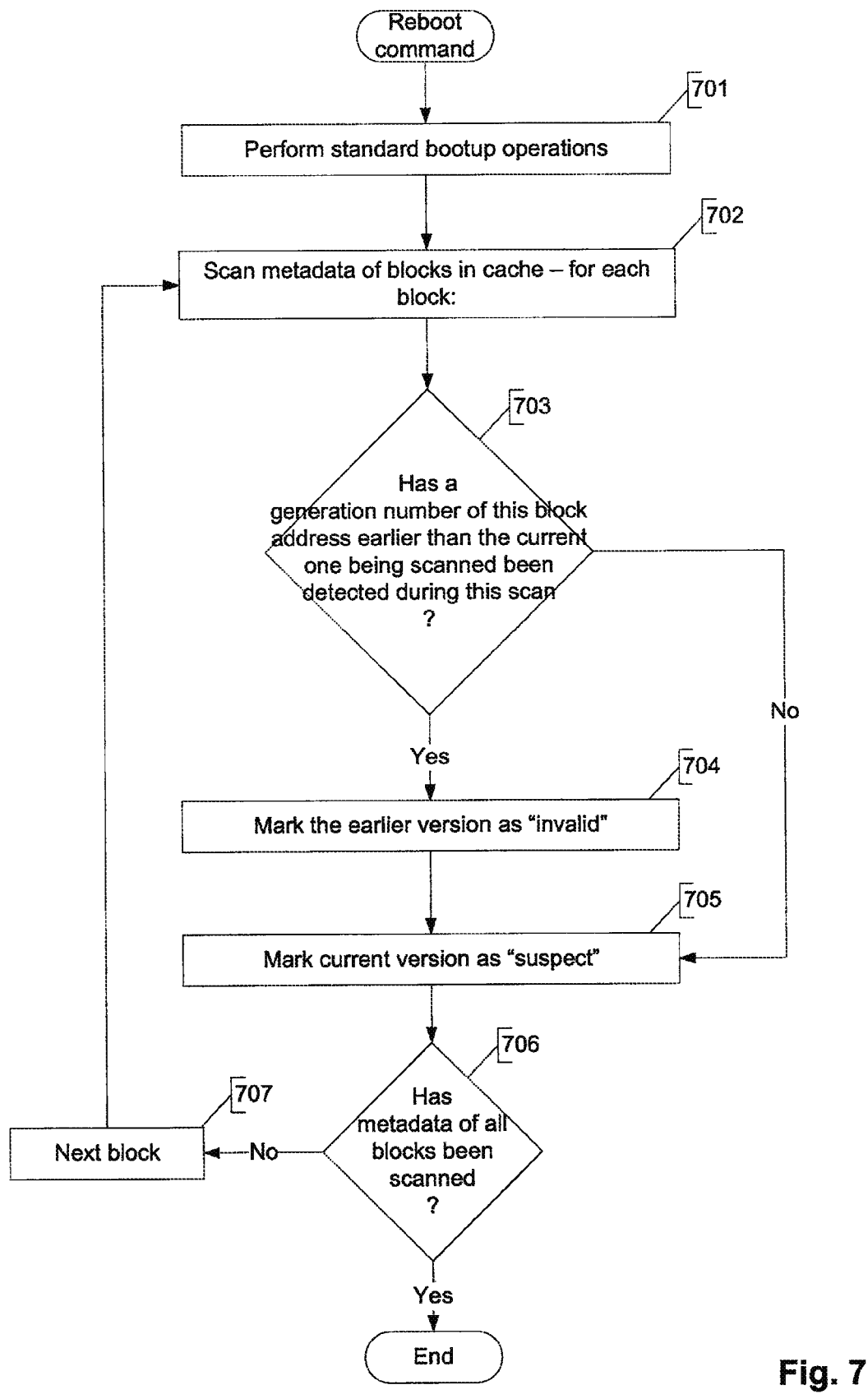
FIG. 7 is a flow diagram of a process for using a logical block address and generation number to maintain cache coherency, according to a fourth embodiment.

This technique is illustrated in FIG. 7. At 701 the caching device performs typical boot up operations such as are well known in the art, the details of which are not germane to the technique being introduced here. At 702 the caching device scans the metadata of the cached blocks and performs the following operations (703-706) for each cached data block.

At 703, for a given data block address, the process looks at the generation number and determines whether any earlier version (lower generation number) for this block address was seen previously during this scan. If so, the process at 704 marks the copy of the earlier version of the data block as "invalid" and marks the current version as "suspect" at 705. It may then later change the state of the block from "suspect" to "valid" according to the method described above in relation to FIG. 6. If no earlier version was seen for this block address during the scan, then the process proceeds from 703 directly to 705, where the current version is marked as "valid". The process ends after the block metadata for all cached data block has been scanned in this way (706, 707).

Now consider another scenario, in which an NFS caching device ("Cache A") receives a write request for the block address, block-4, and at about the same time another NFS caching device ("Cache B") of the same file system receives a write request for block address, block-10, indicating that block-10 should be updated to have the same contents as block-4. Suppose further that Cache B also happens to have data for block-4 cached locally. The data that Cache B has for block-4 is the old data, however, not the data as just modified on Cache A.

Cache A and Cache B now both need to send their changes over to the NFS server. Assume that the NFS server first receives the changes from Cache A, relating to block 4. The server updates the master copy of block 4, which is now different from the copy of block 4 on Cache B. Meanwhile, Cache B has already sent a message to the server indicating that block 10 was just changed and now has the same contents as block 4. But that is now incorrect, because block 4 has changed on the server and block 10 is no longer the same. This situation will produce a data error, i.e., a cache coherency error.

Such errors can be avoided by associating generation numbers with logical block addresses. Modifying the above scenario to do so, Cache B could send a message to the server that essentially says that block-10 was just changed and now has the same contents as version 17 (for example) of block-4. The NFS server would look at the generation number it has recorded for block-4 and see that its copy of block-4 is version 18, not version 17. The NFS server would therefore know that a recent change to block-4 has made the incoming message from Cache B obsolete. Assuming the server has not saved version 17 of block-4, therefore, the NFS server would reply back to Cache B with a message that requests the actual contents of block-10 from Cache B. Cache B would then send the actual data of its block-10 to the NFS server. This process is slower, of course, because an entire block of data is being sent instead of just a short reference, however, data integrity is preserved.

Figure 8:
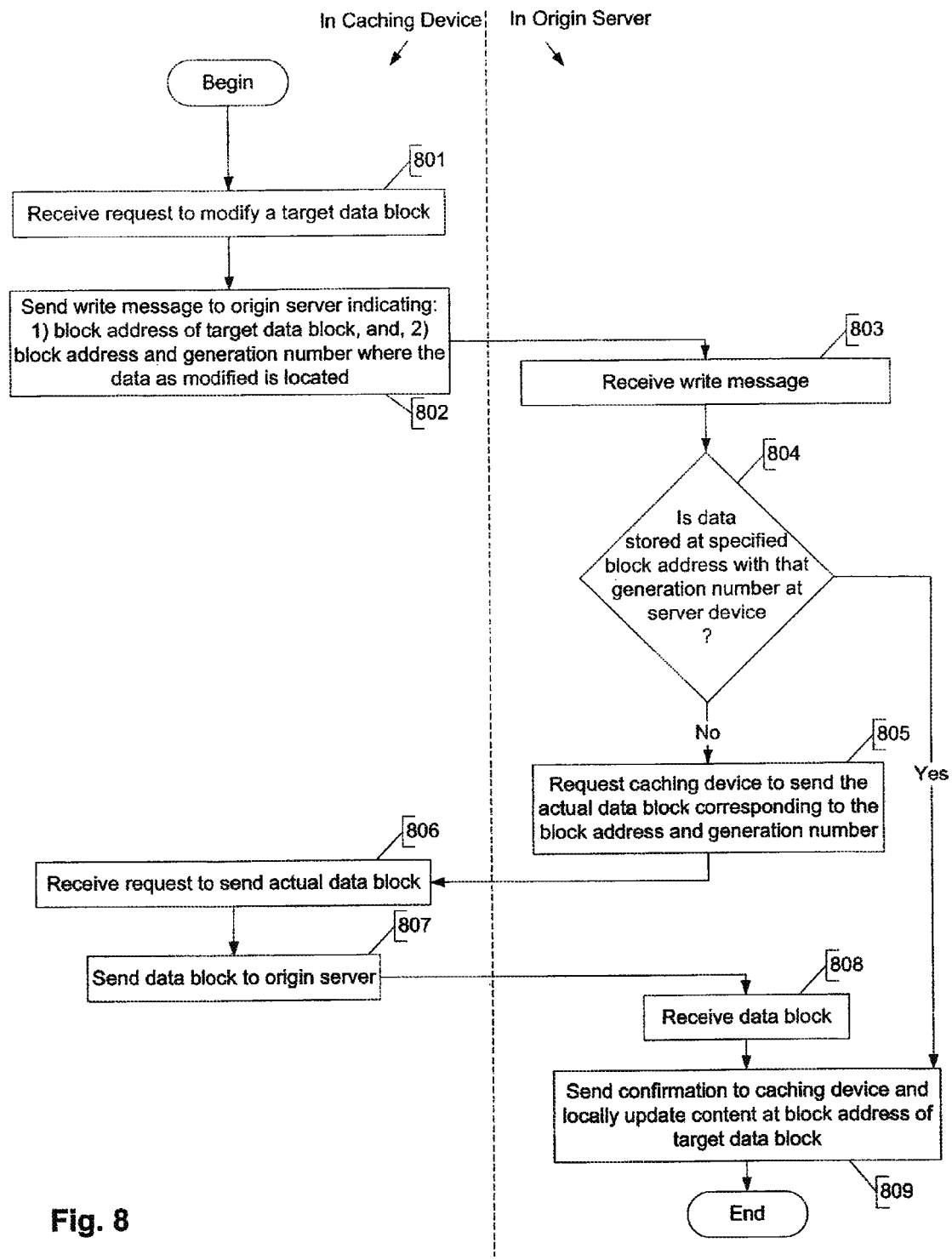
FIG. 8 is a flow diagram of a process for using a logical block address and generation number to maintain cache coherency, according to a third embodiment.

This technique is illustrated in FIG. 8 for the specific scenario just described, i.e., where the caching device already has a copy of the data as modified, but under a different block address. In FIG. 8, the caching device (e.g., a caching server 13) initially receives a request to modify a data block, referred to as the "target data block", at 801. At 802 the caching device sends a write message to the origin server (e.g., origin server 10) indicating: 1) the block address of the target data block (e.g., block-10 in the example described above), and 2) the block address and generation number of the data as modified (block-4, version 17 in the example above). In response to receiving the write message at 803, the origin server determines at 804 whether it has data stored at the block address specified by the write message with the generation number specified by the write message. This determination can be made by performing a lookup in a metadata index of data stored by the origin server. If the server has data stored at the specified block address with the specified generation number, then the process proceeds to 809, where the server sends confirmation of the write to the caching device and locally updates the content at the target block address of the target data block in accordance with the write message. Hence, this technique can be viewed as a method of performing network deduplication (discussed further below) to the extent it avoids sending data blocks to the server unnecessarily.

If, on the other hand, the server determines at 804 that the specified generation number is not the latest generation number for its block address, then at 805 it sends a message to the caching device requesting the caching device to send the actual data block corresponding to that block address and generation number (e.g., block-4, version 17 in the example above). The caching device receives this request at 806 and responds at 807 by sending the data block to the origin server at 807. After receiving the data block at 808, the server proceeds to 809, where it sends confirmation of the right to the caching device and locally updates the content at the target block address of the target data block as specified by the write message.

Network Deduplication

Association of generation numbers with logical block addresses can also be used advantageously for purposes of deduplication in network data transfers, such as in a data mirroring system. Mirroring is a technique for backing up data, where a given data set at a source is replicated exactly at a destination, which is often geographically remote from the source. The replica data set created at the destination is called a "mirror" of the original data set. Typically mirroring involves the use of at least two storage servers, e.g., one at the source and another at the destination, which communicate with each other through a computer network or other type of data interconnect to create the mirror.

In a large-scale storage system, such as an enterprise storage network, it is common for some data to be duplicated and stored in multiple places in the storage system. Sometimes data duplication is intentional and desired, as in mirroring, but often it is an incidental byproduct of normal operation of a storage system. For example, a given sequence of data may be part of two or more different files, LUNS, etc. Consequently, it is frequently the case that two or more blocks of data stored at different block addresses in a storage server are actually identical. Data duplication generally is not desirable, since storage of the same data in multiple places consumes extra storage space, which is a limited resource. Consequently, in many large-scale storage systems, storage servers have the ability to "deduplicate" data.

Deduplication is a well-known method for increasing the capacity of a storage device or system by replacing multiple copies of identical sequences of data with a single copy, together with a much smaller amount of metadata that allows the reconstruction on demand of the original duplicate data. Techniques for deduplicating within a single storage server (or a single node in a storage cluster) are in wide-spread commercial use.

One use of deduplication is to reduce the amount of data sent over a network, such as in a mirroring system. If the recipient of transmitted data stored a set of data segments, and another node of the network wants to send it another data segment, deduplication techniques can be used to avoid sending the data segment if the recipient already has an exact copy of it. This is called network deduplication, or network acceleration, because it increases the effective bandwidth of the network.

The conventional method for identifying duplicate data segments involves using a hash function, such as SHA-1, to compute an integer, called a "fingerprint", from each data segment, where different data is extremely unlikely to produce the same fingerprint. When one node of a network wishes to send a data segment to another node, but only if the data segment is not already present on the other node, the sending node can first send the fingerprint, and the receiving node can inform the sending node whether or not it already has a data segment with that fingerprint. Only if the fingerprint is not found on the receiving node is the data segment sent.

There are two problems with the use of a hash value as a data fingerprint. Firstly, while it is very unlikely, it is possible that two different data segments can produce the same hash value. If that occurs, data corruption can result. Further, the larger the amount of data managed by a given system in a given period of time, the greater is the likelihood that two different data segments actually will produce the same hash value. In a very large-scale storage system, therefore, this very small likelihood can increase to an unacceptably high value.

Additionally, hash values generated by conventional hash algorithms can be quite lengthy, e.g., at least 160 bits (as with SHA-1). Consequently, computing and comparing hash values can be computationally intensive, consuming a significant amount of processor resources. Likewise, a significant amount of storage space can be required to store the hash values in a given storage server or node.

Figure 1B:
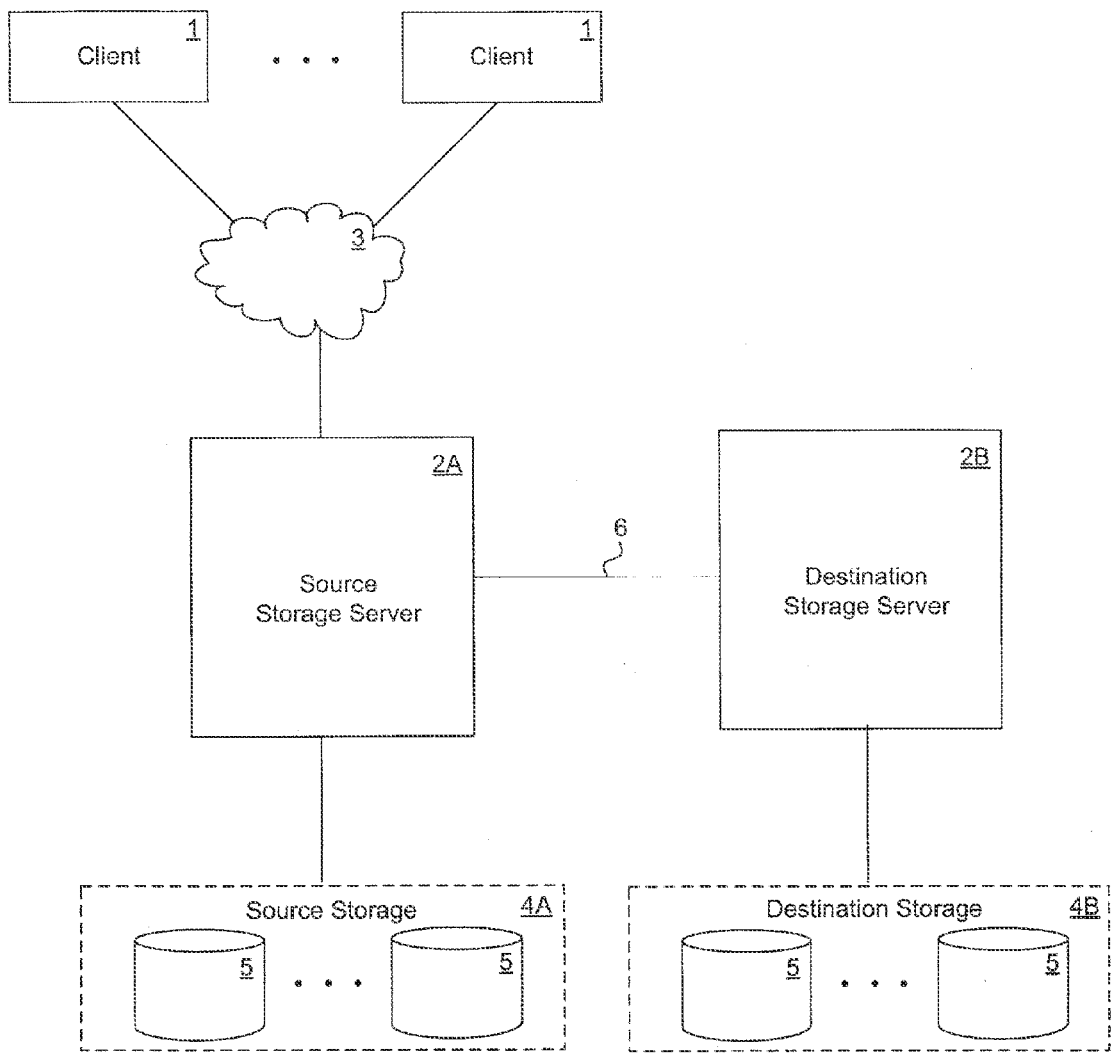

FIG. 1B shows one example of a data mirroring system in which the technique introduced here can be applied. FIG. 1B shows a source storage server 2A and a mirroring (destination) storage server 2B; these are each referred to generically as a storage server 2 whenever the distinction between them is not germane. In FIG. 1B, source storage server 2A is coupled to a source storage subsystem 4A, and is coupled to a set of storage clients 1 through an interconnect 3. The interconnect 3 may be, for example, a local area network (LAN), wide area network (WAN), metropolitan area network (MAN), global area network such as the Internet, a Fibre Channel fabric, or any combination of such interconnects. Each of the clients 1 may be, for example, a conventional personal computer (PC), server-class computer, workstation, handheld computing/communication device, or the like.

Storage of data in the source storage subsystem 4A is managed by storage server 2A. Source storage server 2A and source storage subsystem 4A are collectively referred to as the source storage system. The storage server 2 receives and responds to various read and write requests from the clients 1, directed to data stored in or to be stored in storage subsystem 4A. Storage subsystem 4A includes a number of nonvolatile mass storage devices 5, which can be, for example, conventional magnetic or optical disks or tape drives; alternatively, they can be non-volatile solid-state memory, such as flash memory, or any combination of such devices. The mass storage devices 5 in storage subsystem 4A can be organized as a Redundant Array of Inexpensive Disks (RAID), in which case the storage server 2 accesses the storage subsystem 4 using a conventional RAID algorithm for redundancy.

The source storage server 2A is connected to a destination storage server 2B through an interconnect 6, for purposes of mirroring data. Although illustrated as a direct connection, the interconnect 6 may include one or more intervening devices and/or one or more networks. The source storage server 2A includes a storage operating system (not shown), discussed below, which is responsible for managing storage of data in the source storage subsystem 4A, servicing requests from clients 1, and performing various other types of storage related operations. The source storage server 2A also includes a source mirroring application (SMA) (not shown) and, in certain embodiments, a deduplication application (not shown), either of which may be implemented as part of the storage operating system. The SMA operates in cooperation with a remote destination mirroring application (DMA) (not shown) in the mirroring storage server 2B, to perform logical mirroring of data stored in the source storage subsystem 4A.

Similarly, the destination storage server 2B includes a storage operating system (not shown) to control storage related operations on the destination storage server 2B. The destination storage server 2B and the destination storage subsystem 4B are collectively referred to as the destination storage system. The destination storage server 2B works in cooperation with the source storage server 2A to mirror data from the source storage system to the destination storage system.

In at least one conventional asynchronous data mirroring technique, the SMA first generates a persistent point-in-time image ("snapshot") of a data set to be replicated at the source (e.g., a volume), and then sends that snapshot to the DMA; this data is referred to as the baseline, or baseline snapshot. Subsequently, from time to time, the SMA executes a mirror update process (which may be at the request of the DMA). To do so, the SMA takes an update snapshot of the data set, identifies any data blocks that have been modified since the last snapshot, whichever is later, and sends those changed blocks to the destination.

Storage servers 2A and 2B each may be, for example, a storage server which provides file-level data access services to hosts, such as commonly done in a network attached storage (NAS) environment, or block-level data access services such as commonly done in a storage area network (SAN) environment, or it may be capable of providing both file-level and block-level data access services to hosts. Further, although each storage server 2A or 2B is illustrated as a single unit in FIG. 1B, either or both can have a distributed architecture. For example, a storage server 2 can be designed as a physically separate network module (e.g., "N-module") and data module (e.g., "D-module") (not shown), which communicate with each other over a physical interconnect. The N-module accepts incoming requests from clients of the storage system and then routes each of these requests to the appropriate D-module, each of which is responsible for storing some portion of the data in the distributed system. Such an architecture allows convenient scaling, such as by deploying two or more N-modules and D-modules, all capable of communicating with each other through the interconnect.

The technique of associating generation addresses with block numbers can be used to avoid unnecessarily sending duplicate data over the communication link between storage server 2A and storage server 2B during a mirror update or other similar replication operation, i.e., to perform network deduplication. For example, during a mirror update, the source storage server 2A initially sends only the logical block addresses and corresponding generation numbers of the modified data blocks to the destination storage server 2B. The destination storage server 2B compares those references against its local metadata structure to determine whether it already has any of those data blocks stored (i.e., matching block addresses and generation numbers). If the destination storage server 2B determines that it already has a data block stored, it does not request or receive that data block again from the source storage server 2A. Hence, no data block is sent more than once from the source storage server 2A to the destination storage server 2B for purposes of data replication (e.g., for purposes of creating or updating a mirror).

Figure 9:
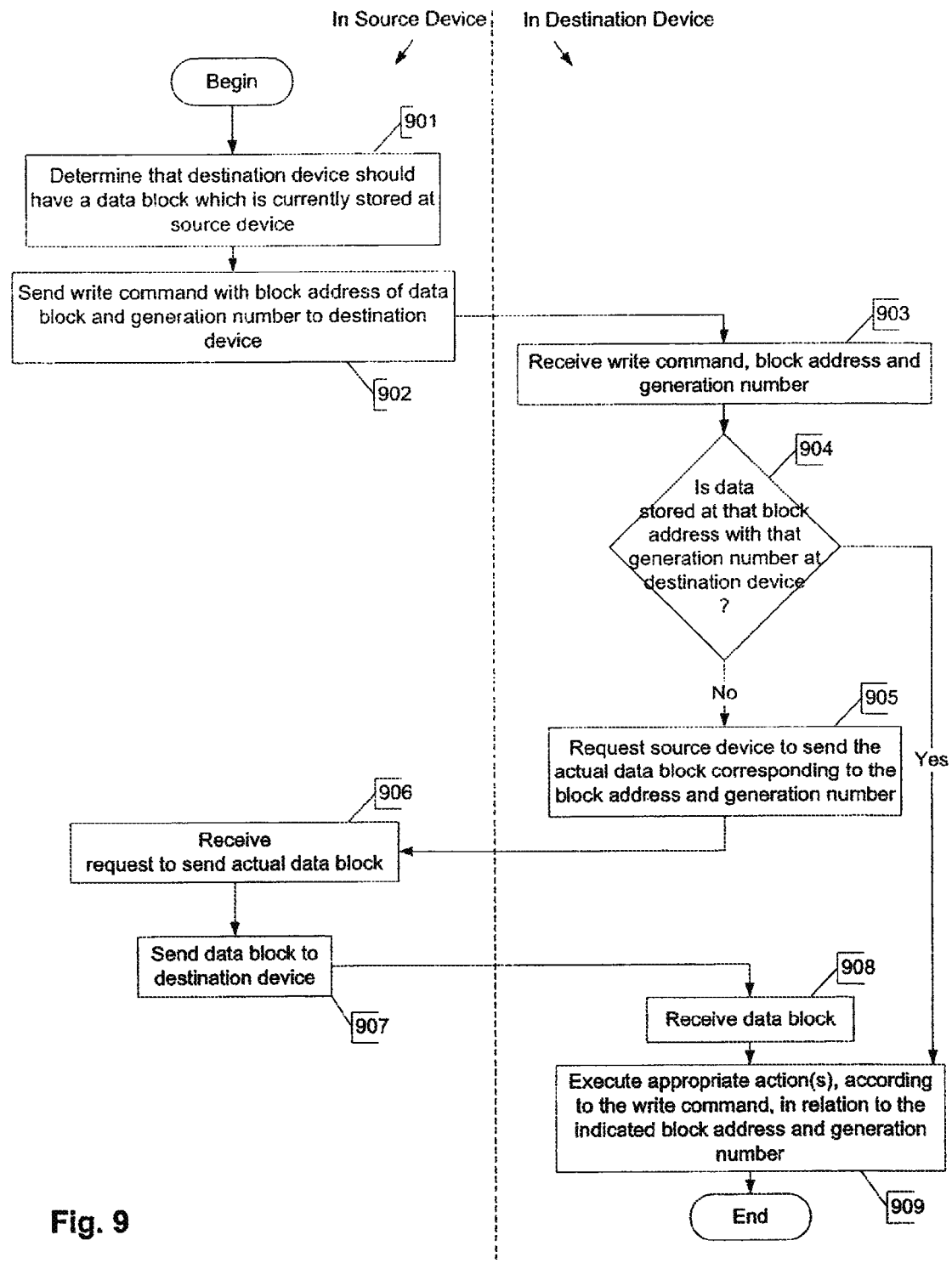
FIG. 9 is a flow diagram of a process for using a logical block address and generation number in network deduplication.

FIG. 9 illustrates an example of a process of using logical block addresses and generation numbers to perform network deduplication. This process can apply to, for example, a mirroring system such as shown in FIG. 1B or a distributed content caching system such as shown in FIG. 1A. Note also that the network deduplication and cache coherency techniques described here can overlap. For example, note that the network deduplication process of FIG. 9 is similar to the process of FIG. 8 discussed above in relation to cache coherency.

Initially, at 901 a source device (e.g., source storage server 2A in FIG. 1B or a client 1 in FIG. 1A) determines that a destination device (e.g., destination storage server 2B in FIG. 1B or the server in FIG. 1A) should have a data block which is currently stored at the source device. For example, this determination may be done as part of a mirroring update operation in a mirroring system. As another example, it may be done as part of a write-through operation from the caching device to the origin server when the caching device updates the data block in response to a write request. Next, at 902 the source device sends to the destination device an appropriate type of write command (depending on the purpose), with a logical block address (e.g., VVBN) of the data block and the latest generation number of that logical block address. Depending on the purpose of the operation (e.g., mirroring update, cache write-through), the write command may also include or be accompanied by other information or parameters. For example, in the case of a cache write-through, the logical block address and generation number might identify a segment of source data, and the write command might include another logical block address as the target address to be updated with that source data.

The destination device receives the write command, logical block address and generation number at 903. In response, the destination device determines at 904 whether it has data stored at that block address with that generation number. This determination can be made by performing a lookup in a metadata index of data stored by the destination device. The location and format of this metadata index is not germane to the technique introduced here. If the destination device determines that it has that data stored, then the process branches to 909, where the destination device executes the appropriate action(s), according to the write command, in relation to the indicated logical block address and generation number. The appropriate action might be, for example, modifying or creating data at a target block address in the destination device with the data associated with the specified logical block address and generation number in the destination device. The process then ends.

On the other hand, if the destination device determines at 904 that it does not have data corresponding to the specified logical block address and generation number, then the process instead proceeds from 904 to 905. At 905 the destination device sends a request to the source device to send the actual data block corresponding to the specified logical block address and generation number. The source device receives that request at 906 and responds by sending the actual data block to the destination device at 907. The destination device receives the data block at 908. The process then continues to 909, as described above.

Implementation

Figure 2:
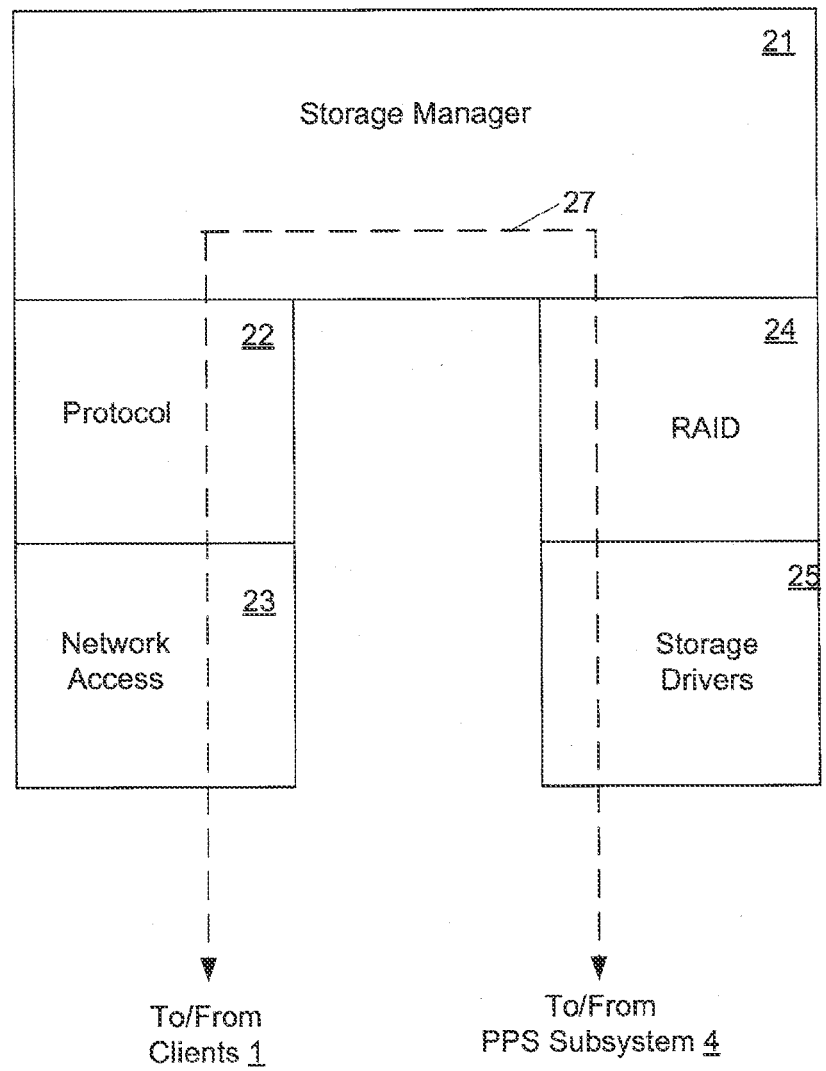
FIG. 2 illustrates an example of the architecture of the storage operating system of a storage server.

A caching server 13 such as shown in FIG. 1A or a storage server 2 such as shown in FIG. 1B, can include a storage operating system for use in controlling its basic operations (organizing data, reading and writing data in response to client requests, etc.). FIG. 2 schematically illustrates an example of the architecture of such a storage operating system. The storage operating system 20 can be implemented in programmable circuitry programmed with software and/or firmware, or in specially designed non-programmable circuitry, or in a combination thereof. In the illustrated embodiment, the storage operating system 20 includes several modules, or "layers". These layers include a storage manager 21, which is the core functional element of the storage operating system 20. The storage manager 21 imposes a structure (e.g., one or more file systems) on the data managed by the storage server 2 and services read and write requests from clients 1.

To allow the device to communicate over the network 3 (e.g., with clients 1 or 11), the storage operating system 20 also includes a protocol layer 22 and a network access layer 23, logically "under" the storage manager 21. The protocol 22 layer implements various higher-level network protocols, such as Network File System (NFS), Common Internet File System (CIFS), Hypertext Transfer Protocol (HTTP), Internet small computer system interface (iSCSI), and/or backup/mirroring protocols. The network access layer 23 includes one or more network drivers that implement one or more lower-level protocols to communicate over the network, such as Ethernet, Internet Protocol (IP), Transport Control Protocol/Internet Protocol (TCP/IP), Fibre Channel Protocol (FCP) and/or User Datagram Protocol/Internet Protocol (UDP/IP).

Also, to allow the device to communicate with a storage subsystem (e.g., storage subsystem 4), the storage operating system 20 includes a storage access layer 24 and an associated storage driver layer 25 logically under the storage manager 21. The storage access layer 24 implements a higher-level disk storage redundancy algorithm, such as RAID-4, RAID-5 or RAID-DP and, therefore, is henceforth referred to as "RAID layer 24" to facilitate description. The storage driver layer 25 implements a lower-level storage device access protocol, such as Fibre Channel Protocol (FCP) or small computer system interface (SCSI).

Also shown in FIG. 2 is the path 27 of data flow through the storage operating system 20, associated with a read or write operation, from the client interface to the storage interface. Thus, the storage manager 21 accesses the storage subsystem 4 through the storage access layer 24 and the storage driver layer 25.

The storage operating system 20 can have a distributed architecture. For example, the protocol layer 22 and network access layer 23 can be contained in an N-module (e.g., N-blade) while the storage manager 21, storage access layer 24 and storage driver layer 25 are contained in a separate D-module (e.g., D-blade). In such cases, the N-module and D-module communicate with each other (and, possibly, with other N- and D-modules) through some form of physical interconnect and collectively form a storage server node. Such a storage server node may be connected with one or more other storage server nodes to form a highly scalable storage server cluster.

Figure 3:
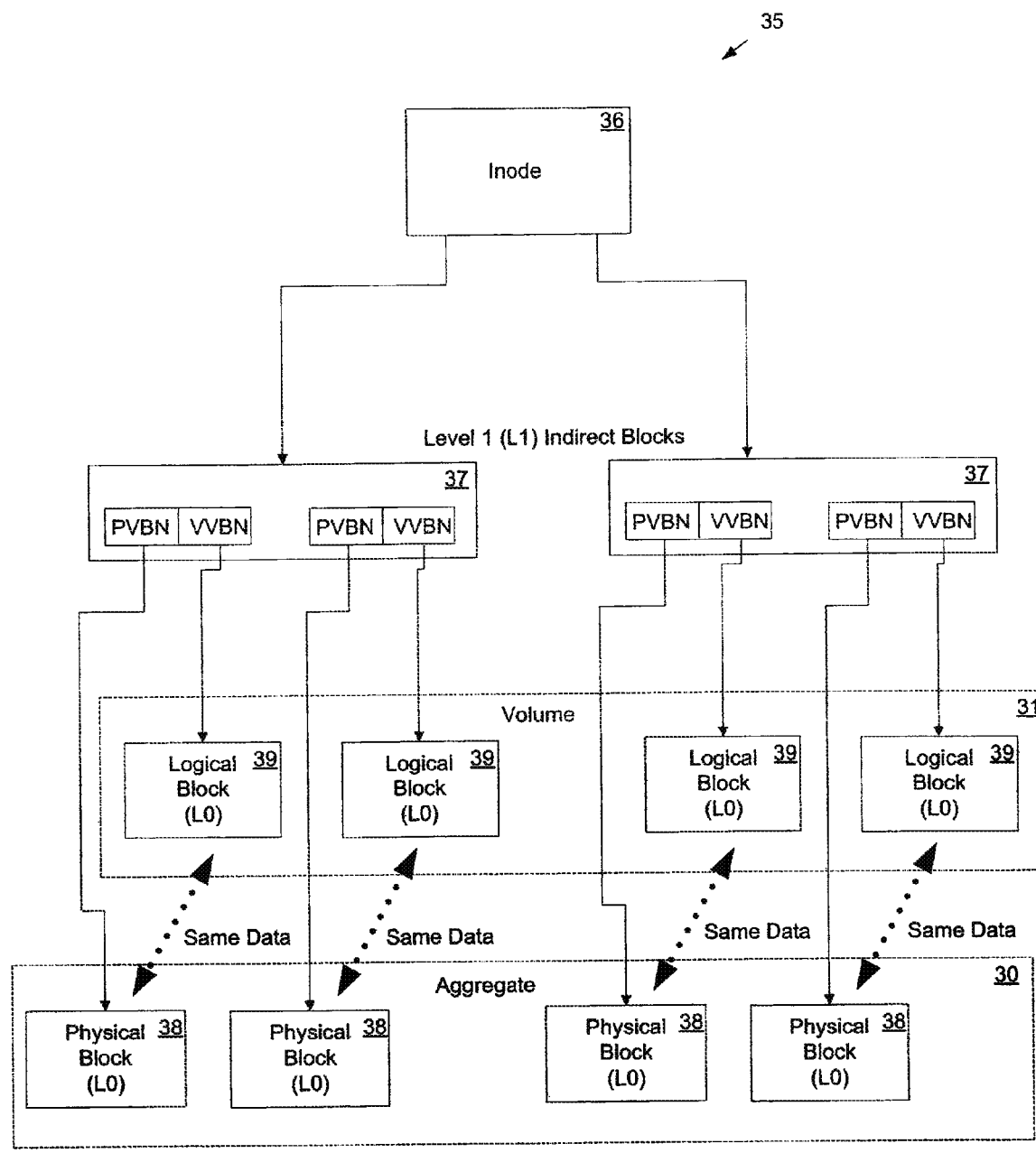
FIG. 3 shows an example of a buffer tree of a data set, including physical and logical block pointers.
Figure 4:
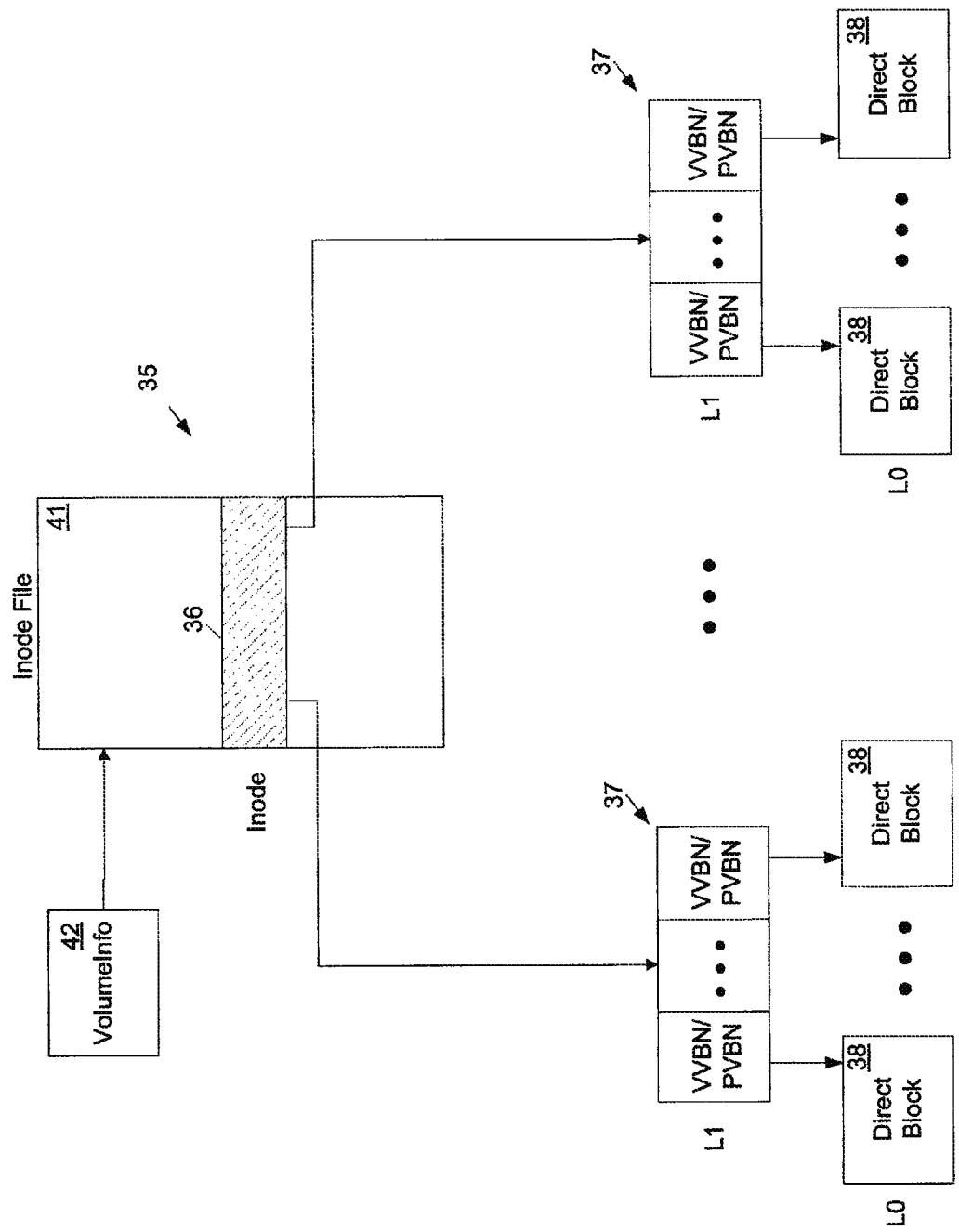
FIG. 4 shows the relationship between inodes, an inode file and a buffer tree.

It is useful now to consider how data can be structured and organized by operating system 20 in certain embodiments of the techniques introduced here. Reference is now made to FIGS. 3 and 4 in this regard.

In at least one embodiment, data is stored in the form of volumes, where each volume contains one or more directories, subdirectories, and/or files. A "volume" is a set of stored data associated with a collection of mass storage devices, such as disks, which obtains its storage from (i.e., is contained within) an aggregate, and which is managed as an independent administrative unit, such as a complete file system. An "aggregate" is a pool of storage, which combines one or more physical mass storage devices (e.g., disks) or parts thereof into a single logical storage object. An aggregate contains or provides storage for one or more other logical data sets at a higher level of abstraction, such as volumes.

In certain embodiments, an aggregate uses a physical volume block number (PVBN) space that defines the storage space of physical blocks provided by the storage devices of the volume, and each volume uses a virtual volume block number (VVBN) space to organize those blocks into one or more higher level objects, such as directories, subdirectories, qtrees and files. A PVBN, therefore, is a physical block address, i.e., the address of a physical block in the aggregate. A VVBN is a logical block address, i.e., the address of a block in a volume (the same block as referenced by the corresponding PVBN), i.e., the offset of the block within a file that represents the volume. Knowledge of all of the VVBNs and PVBNs is maintained by the storage operating system in each storage server 2. Each VVBN space is an independent set of values that corresponds to locations within a directory or file, which are translated by the storage access layer 34 to device block numbers (DBNs) on a physical storage device.

Each volume can be a separate file system that is "mingled" with other volumes onto a common set of storage in the aggregate by the storage operating system. A RAID layer in the storage operating system builds a RAID topology structure for the aggregate that guides each volume when performing write allocation. The RAID layer also presents a PVBN-to-DBN mapping to the storage manager 21.

In addition, the storage operating system may also maintain another type of logical block number for each data block: If the storage server stores data in the form of files, the storage operating system may also use file block numbers (FBNs). Each FBN indicates the logical position of the block within a file, relative to other blocks in the file, i.e., the offset of the block within the file. For example, FBN 0 represents the first logical block in the file, FBN 1 represents the second logical block in the file, and so forth. Note that the PVBN and VVBN of a data block are independent of the FBN(s) that refer to that block.

In certain embodiments, each file is represented in a storage server on the form of a hierarchical structure called a "buffer tree". A buffer tree is a hierarchical structure which used to store file data as well as metadata about a file, including pointers for use in locating the data blocks for the file. A buffer tree includes one or more levels of indirect blocks (called "L1 blocks", "L2 blocks", etc.), each of which contains one or more pointers to lower-level indirect blocks and/or to the direct blocks (called "L0 blocks") of the file. All of the user data in a file is stored only in the lowest level (L0) blocks.

The root of a buffer tree is the "inode" of the file. An inode is a metadata container that is used to store metadata about the file, such as ownership, access permissions, file size, file type, and pointers to the highest level of indirect blocks for the file.

Each file has its own inode. The inode is stored in a separate inode file, which may itself be structured as a buffer tree.

FIG. 3 shows an example of a buffer tree 35 of a file. The file is assigned an inode 36, which references Level 1 (L1) indirect blocks 37. Each indirect block 37 stores at least one PVBN and a corresponding VVBN for each PVBN. There is a one-to-one mapping between each VVBN and PVBN. Note that a VVBN is a logical block number in a volume, which is a virtual number for addressing; but there is only one copy of the L0 data block physically stored. Also, to simplify description, only two PVBN-VVBN pairs are shown in each indirect block 37 in FIG. 3; however, an actual implementation would likely include many PVBN-VVBN pairs in each indirect block 37. Each PVBN references a physical block 38 in a storage device (i.e., in the aggregate 30) and the corresponding VVBN represents the corresponding logical block 39 in a file that represents the volume (called the "container file") 31. Physical blocks 38 and logical blocks 39 are actually the same L0 data for any particular PVBN-VVBN pair, however, they are accessed in different ways: The PVBN is accessed directly in the aggregate 30, while the VVBN is accessed virtually via the volume container file 31.

Referring now to FIG. 4, for each volume managed by the storage server 2, the inodes of the files and directories in that volume are stored in a separate inode file 41. A separate inode file 41 is maintained for each volume. Each inode 36 in an inode file 41 is the root of the buffer tree 35 of a corresponding file. The location of the inode file 41 for each volume is stored in a Volume Information ("VolumeInfo") block 42 associated with that volume. The VolumeInfo block 42 is a metadata container that contains metadata that applies to the volume as a whole. Examples of such metadata include, for example, the volume's name, type, size, any space guarantees to apply to the volume, and the VVBN of the inode file of the volume.

Figure 10:
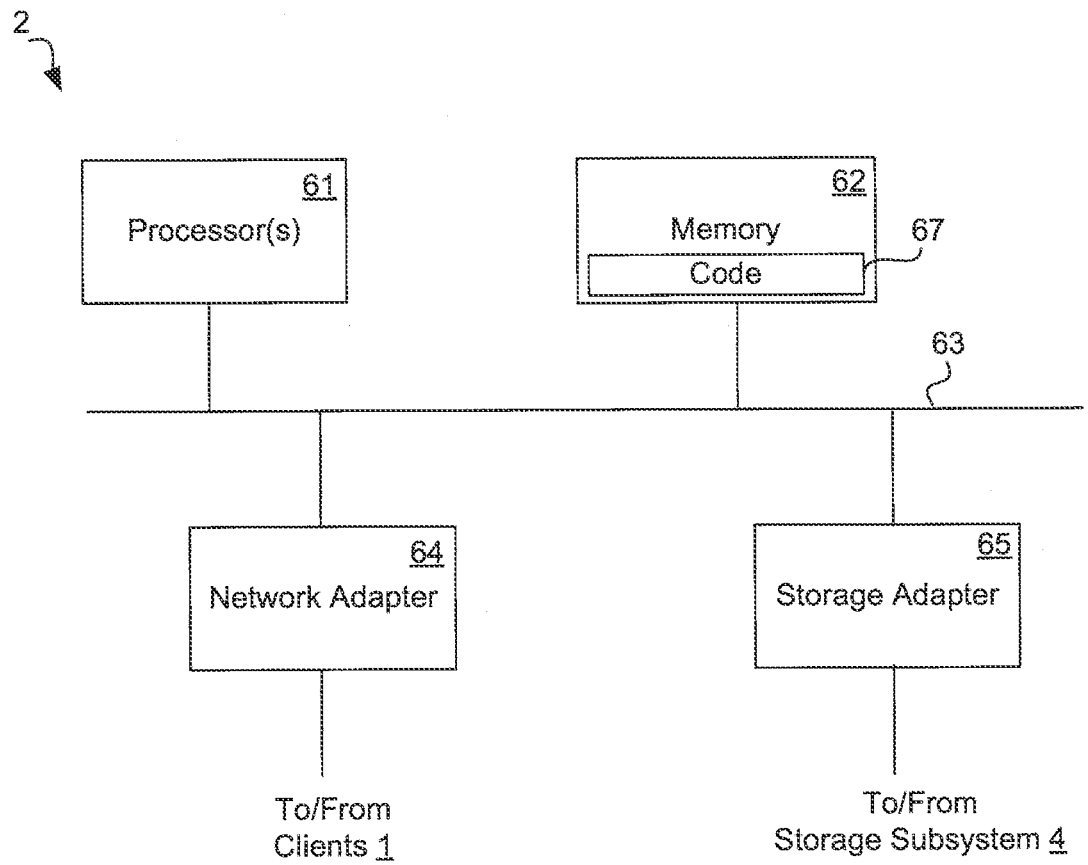
FIG. 10 is a high-level block diagram of the architecture of a storage server.

FIG. 10 is a high-level block diagram showing an example of the architecture of a storage server 2, such as storage server 2A or 2B. The storage server 2 includes one or more processors 61 and memory 62 coupled to an interconnect 63. The interconnect 63 shown in FIG. 10 is an abstraction that represents any one or more separate physical buses, point-to-point connections, or both connected by appropriate bridges, adapters, or servers. The interconnect 63, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 61 is/are the central processing unit (CPU) of the storage server 2 and, thus, control the overall operation of the storage server 2. In certain embodiments, the processor(s) 61 accomplish this by executing software or firmware stored in memory 62. The processor(s) 61 may be, or may include, one or more programmable general-purpose or special-purpose microprocessors, digital signal processors (DSPs), programmable servers, application specific integrated circuits (ASICs), programmable logic devices (PLDs), trusted platform modules (TPMs), or the like, or a combination of such devices.

The memory 62 is or includes the main memory of the storage server 2. The memory 62 represents any form of random access memory (RAM), read-only memory (ROM), flash memory, or the like, or a combination of such devices. In use, the memory 62 may contain, among other things, code 67 embodying at least a portion of a storage operating system of the storage server 2. Code 67 can also include a mirroring application and/or deduplication application.

Also connected to the processor(s) 61 through the interconnect 63 are a network adapter 64 and a storage adapter 65. The network adapter 64 provides the storage server 2 with the ability to communicate with remote devices, such as clients 1, over the interconnect 3 and may be, for example, an Ethernet adapter or Fibre Channel adapter. The storage adapter 65 allows the storage server 2 to access a storage subsystem, such as storage subsystem 4A or 4B, and may be, for example, a Fibre Channel adapter or SCSI adapter.

The techniques introduced above can be implemented in software and/or firmware in conjunction with programmable circuitry, or entirely in special-purpose hardwired circuitry, or in a combination of such embodiments. Special-purpose hardwired circuitry may be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, can include, for example, special-purpose hardwired circuitry, software and/or firmware in conjunction with programmable circuitry, or a combination thereof.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A storage server, comprising:
a network interface through which to communicate over a network;
a storage interface through which to communicate with a storage device;
a processor;
a non-transitory computer readable medium that stores instructions that when executed by the processor, cause the storage to,
receive, via the network interface, a write request including a source block address and a generation number, wherein a source device stores data associated with the write request at the source block address, and the generation number indicates a number of times that data at the source block address has been modified;
determine whether storage server already has a data block that matches the source block address and the generation number; and
process the write request by copying the data block that matches the source block address and the generation number to a data block in the storage device via the storage interface, without receiving the data associated with the write request from the source device, if the storage server already has the data block that matches the source block address and the generation number.

2. The storage server of claim 1, wherein the storage server is configured to have permission to modify the data block.

3. The storage server of claim 1, wherein the source block address and the generation number uniquely identify the data at the source block address within the source device.

4. The storage server of claim 1, wherein the non-transitory computer readable medium further stores instructions that when executed by the processor, cause the storage server to:
increment a generation number of a block address each time the data at the block address is modified.

5. The storage server of claim 1, wherein said determining whether the storage server already has a data block that matches the source block address and the generation number comprises performing a lookup in a metadata index containing generations numbers associated with blocks addresses of the storage device.

6. The storage server of claim 1, wherein said processing the write request comprises requesting the data associated with the write request from the source device if the storage server does not have a data block that matches the source block address and the generation number.

7. The storage server of claim 1, wherein the storage server is a network caching device and the destination device is an origin server for content cached by the storage server.

8. The storage server of claim 1, wherein the storage device is a non-volatile mass storage device.

\* \* \* \* \*